United States Patent
Rangaraj

(10) Patent No.: US 10,911,236 B2
(45) Date of Patent: Feb. 2, 2021

(54) SYSTEMS AND METHODS UPDATING CRYPTOGRAPHIC PROCESSES IN WHITE-BOX CRYPTOGRAPHY

(71) Applicant: PAYPAL, INC., San Jose, CA (US)

(72) Inventor: Srinivasan Rangaraj, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 409 days.

(21) Appl. No.: 15/841,001

(22) Filed: Dec. 13, 2017

(65) Prior Publication Data

US 2019/0182046 A1 Jun. 13, 2019

(51) Int. Cl.
*H04L 9/32* (2006.01)
*H04L 9/06* (2006.01)
*H04L 9/08* (2006.01)
*H04L 29/06* (2006.01)

(52) U.S. Cl.
CPC .......... *H04L 9/3226* (2013.01); *H04L 9/0618* (2013.01); *H04L 9/0662* (2013.01); *H04L 9/0891* (2013.01); *H04L 67/42* (2013.01); *H04L 2209/16* (2013.01)

(58) Field of Classification Search
CPC ... H04L 9/3226; H04L 9/0662; H04L 9/0891; H04L 9/0618; H04L 67/42; H04L 2209/16
See application file for complete search history.

(56) References Cited

U.S. PATENT DOCUMENTS

| 8,625,794 | B2 * | 1/2014 | Michiels | H04L 9/002 380/255 |
| 2013/0332724 | A1 * | 12/2013 | Walters | H04L 63/0471 713/153 |
| 2014/0282846 | A1 * | 9/2014 | DeWeese | H04L 63/0428 726/1 |

(Continued)

OTHER PUBLICATIONS

Brecht Wyseur, "White-Box Cryptography: Hiding Keys in Software", NAGRA Kudelski Group, Switzerland, www.whiteboxcrypto.com/files/2012_misc.pdf , 9 pgs.

*Primary Examiner* — Kendall Dolly
*Assistant Examiner* — Kevin Ayala
(74) *Attorney, Agent, or Firm* — Haynes and Boone, LLP

(57) ABSTRACT

A method including: receiving a first plurality of randomly-selected logical operations; performing a first decryption of first client credentials stored locally at the client device by inputting cipher code to a decryption algorithm, wherein the decryption algorithm includes the first plurality of randomly-selected logical operations; subsequent to the first decryption of the first client credentials, performing a first authentication of the client-based application with a server, including transferring the first client credentials to the server; after the first authentication, receiving a second plurality of randomly-selected logical operations from a network resource separate from the client device; applying the second plurality of randomly-selected logical operations to the decryption algorithm; and performing a second decryption of the first client credentials stored locally at the client device by inputting the cipher code to the decryption algorithm, wherein the decryption algorithm includes the second plurality of randomly-selected logical operations.

20 Claims, 6 Drawing Sheets

(56) References Cited

U.S. PATENT DOCUMENTS

| | | | |
|---|---|---|---|
| 2015/0163054 A1* | 6/2015 | Roelse | H04L 9/06 380/278 |
| 2015/0270951 A1* | 9/2015 | Michiels | H04L 9/002 380/28 |
| 2017/0300716 A1* | 10/2017 | Reisgies | G06F 21/6245 |
| 2019/0005229 A1* | 1/2019 | Hlaing | G06F 8/61 |

* cited by examiner

SYSTEMS AND METHODS UPDATING CRYPTOGRAPHIC PROCESSES IN WHITE-BOX CRYPTOGRAPHY

BACKGROUND

Field of the Disclosure

The present disclosure generally relates to data security, and more particularly to updating cryptographic processes in white-box systems.

Related Art

With the ever-increasing use of computers, electronic transactions conducted between devices are likewise increasing in number. In some examples, a client device, such as a mobile phone or point-of-sale (POS) system, may have an application that communicates with a remote server. Such communication between the application and the remote server may include sensitive information, such as passwords and other account information. Furthermore, client applications may authenticate themselves with servers at the beginning of a transaction in order to establish an identity of the client application, and that identity may be linked to permission.

Secure communications between devices may therefore rely on encryption. If mechanisms used to provide encryption are compromised, however, an attacker may find it more easy to compromise a service.

Figure 1:
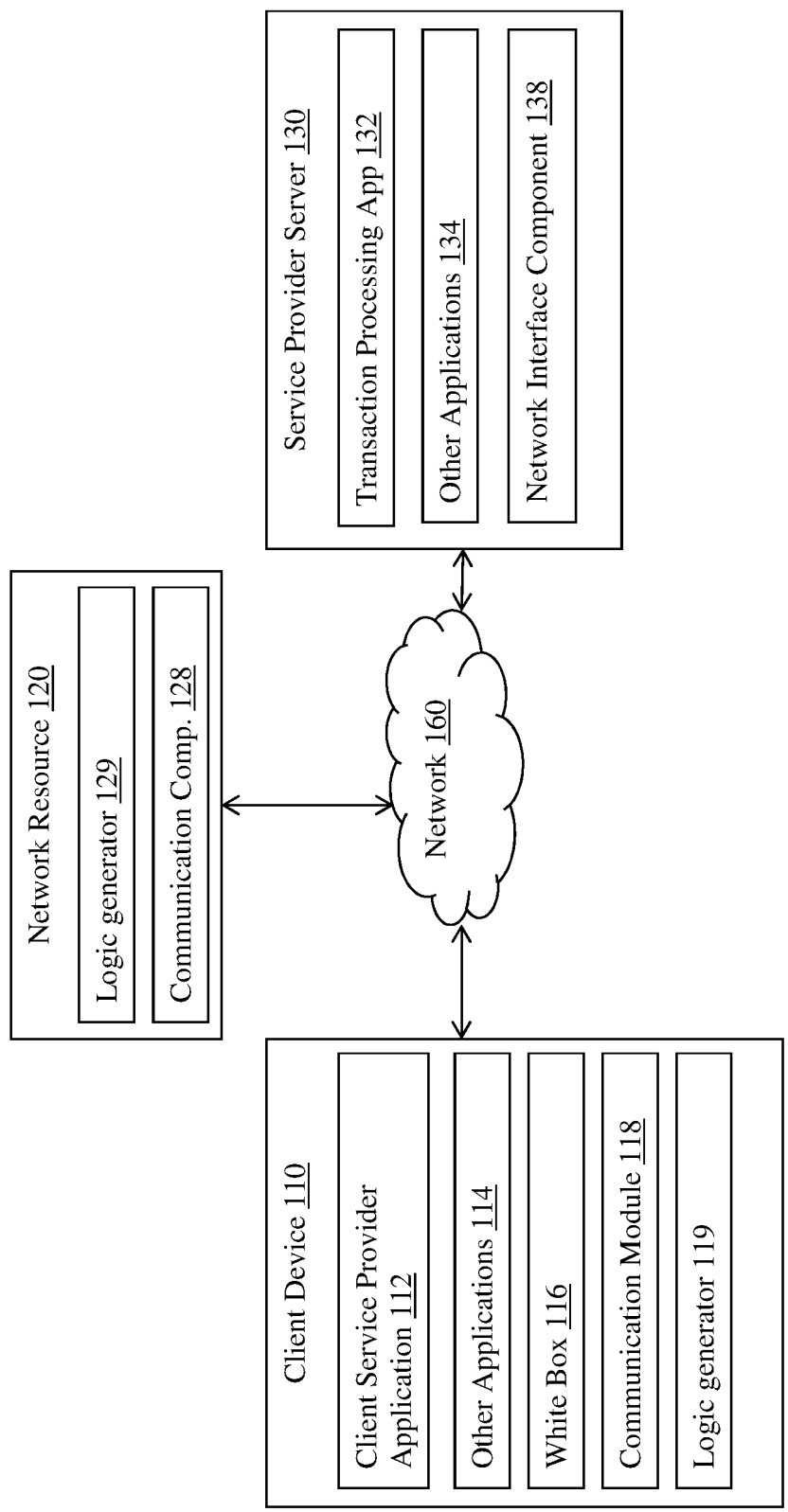
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

An example of a client application may include a payment application, for a consumer or a merchant, wherein the client application authenticates itself with a server. Another example of a client application includes a media player that plays digitally protected media. A traditional technique for authenticating client applications includes white-box cryptography. In some white-box cryptographic systems, source code for the application is not accessible, and information to identify the client application may be buried within the binary code base. At runtime, the application instantiates a decryption algorithm and then inputs at least a portion of its binary code to the decryption algorithm, thereby resulting in decrypted data that may be used to authenticate the client application. Once the application is shutdown or the device is powered off, the memory registers are cleared, and there is no trace of the decryption algorithm itself or the code that it decrypted. In theory, an attacker may be able to compromise the white-box device by monitoring memory registers during runtime, although that proves to be a very complicated task.

Nevertheless, white-box cryptography does have some weaknesses, especially in maintaining secrecy of the decryption algorithm itself. Thus, there is a need for systems and methods capable of providing security for the cryptographic processes in white-box systems.

The present disclosure describes systems and methods for increasing security by updating cryptographic processes in white-box systems in various embodiments. For instance, some embodiments may use randomly-selected logical operations within a cryptographic algorithm in order to increase complexity for an attacker who may monitor memory registers. Continuing with the example, such embodiments may update the cryptographic algorithm by providing additional randomly-selected logical operations from a network resource that is separate from the client application. Such updating may be performed at scheduled times, periodically, or as desired, thereby creating a cryptographic algorithm that not only appears different at each instantiation, but includes a greater degree of randomness than would a white-box system that generates randomly-selected logical operations from a set of operations stored to the client device itself and not updated.

In one example use case, at startup of the client-based application, the client-based application communicates with a client-based logical operations generator in order to receive a first set of randomly-selected logical operations. Examples of logical operations may include functions that provide an output in response to an input, such as Boolean operations (AND, OR, XOR, etc.), lookup table entries, bit shifts, and the like. Thus, some or all of the logical operations may be simple functions having truth tables. Further in this example, the logical operations generator may be included in the same code base as that of the application or may be in a separate code base. The logical operations generator uses pseudorandom algorithms to determine which logical operations, out of a set of logical operations, to send to the client-based application.

The set of randomly-selected logical operations includes multiple pairs of logical operations and their respective inverse logical operations. In one example, inverse operation X is paired with $X^{-1}$ so that the two annihilate or cancel each other. The other randomly-selected logical operations, e.g., Y and Z are also paired with their own inverses. The logical operations generator sends the randomly-selected logical operations to the client-based application, which applies the randomly-selected logical operations to a decryption algorithm of the client-based application. In this particular example, the decryption algorithm itself is made up of a plurality of logical operations, and the client-based application adds the annihilating pairs to the decryption algorithm, which increases the length and complexity of the decryption algorithm. But since the randomly-selected logical operations are annihilating pairs, they do not change the output of the decryption algorithm. Nevertheless, the presence of the annihilating pairs within the decryption algorithm is assumed to make it much more difficult for an attacker to observe the operation of the decryption algorithm itself by monitoring memory registers or other operating functions of the client device.

The client-based application inputs cipher code to the decryption algorithm, then the output of the decryption algorithm includes decrypted or clear text client credentials. For instance, the cipher code may be included in a section of code within the binary code of the application code base itself. The cipher code may include encrypted information, such as a client identifier, client secret, or any other useful and perhaps sensitive information. The client-based application then authenticates itself with the server by, e.g., using an application programming interface (API) to transfer a portion of the decrypted client credentials (e.g., a decrypted secret) to the server. After the client-based application authenticates itself with the server, the server and the client-based application may begin further processing. Examples of further processing may include the server sending information to the client-based application to allow the application to perform payment operations, play restricted media, or the like.

Continuing with the example use case, the communication session may eventually cease by, e.g., the client-based application closing or the client device being powered down. At some time in the future, the client-based application determines to authenticate itself with the server again. The client-based application may repeat the process described above; however instead of requesting randomly-generated logical operations from the local logical operations generator, the client-based application instead requests randomly-generated logical operations from a network resource that is separate from the client device. For instance, the network resource may be located at the server or maybe another server or set of servers at another location on the network. In one example, the network resource provides a set of multiple annihilating pairs to the local logical operations generator to update or replace the previous set of annihilating pairs. The client-based application then continues to rely upon the local logical operations generator, though the local logical operations generator is updated and from time to time to add a greater degree of randomness. In another example, the network resource provides a group of randomly-selected logical operations directly to the client-based application to be applied to the decryption algorithm.

In any event, the client-based application receives randomly-selected logical operations that originated from the network resource. The client-based application applies the annihilating pairs to the decryption algorithm, decrypts credentials, and authenticates itself with the server.

Various embodiments may include one or more advantages over some white-box systems. For instance, updating or replacing the logical operations from a network resource may provide increased security compared to a system that merely stores a set of logical operations locally on the client device and does not update the logical operations. Or put another way, updating or replacing the logical operations from a network resource may add further unknowns, as seen by an attacker who monitors memory registers, because such an attacker would see more variation between subsequent logins.

Furthermore, some embodiments may provide protection against an insider attack originating from an employee of a service associated with the server. Specifically, updating or replacing the logical operations from time to time, and performing the updating or replacing from a network resource, may prevent a scenario where any one employee at a service has comprehensive knowledge about the logical operations used at a particular given client-based application.

In another example, the network resource may update the code base of the client-based application. This may be done in addition to or instead of updating the logical operations. For instance, the network resource may update the code base at the client-based application so that the client credentials are different. Thus, at a later time when the cipher text is applied to the decryption algorithm, the output of the decryption algorithm is clear text but may be different from the client credentials in the example above. Authentication with the server proceeds as noted above.

Some example embodiments may update or replace the logical operations to provide security and then at some later time also update the code base. Updating the code base may provide further complexity for an attacker seeking to monitor the memory registers, thereby making the white-box system much more difficult to compromise.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments.

Exemplary devices and servers may include mobile devices, laptop computers, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, a network resource 120, and a service provider server 130 in communication over a network 160. A user (not shown) may utilize client device 110 for a variety of different functions, including making or completing purchases via client service provider application 112. Thus, in one example the user of client device 110 is a consumer who makes a purchase at a merchant. In another example, the user of client device 110 is a merchant who completes a transaction. In either case, the client device 110 may communicate with the service provider server 130 over network 160 using a secured connection.

Client device 110 and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented as a communication device that may utilize appropriate hardware and software configured for wired and/or wireless communication with network resource 120 and/or service provider server 130. For example, in one embodiment, client device 110 may be implemented as a personal computer (PC), a smart phone, laptop/tablet computer, wristwatch with appropriate computer hardware resources, eyeglasses with appropriate computer hardware, other type of wearable computing device, implantable communication devices, and/or other types of computing devices capable of transmitting and/or receiving data, such as an IPAD® from APPLE®. Examples of operating systems for use with client device 110 include iOS® OS, Android® OS, and the like. Client device 110 may be managed or controlled by any suitable processing device. Although only one client device 110 is shown, a plurality of like client devices may function similarly.

Client device 110 of FIG. 1 contains a client service provider application 112, other applications 114, a white-box application 116, a communication module 118, and a logic generator 119. Client service provider application 112, white-box application 116, other applications 114, and logic generator 119 may correspond to executable processes, procedures, and/or applications with associated hardware. In other embodiments, client device 110 may include additional or different modules having specialized hardware and/or software as desired.

Client service provider application 112 may correspond to one or more processes to execute modules and associated devices of client device 110 to initiate, receive, and/or process/complete transactions using services provided by service provider server 130. In this regard, client service provider application 112 may correspond to specialized hardware and/or software utilized by client device 110 to provide an interface to permit the user associated with client device 110 to make payment or receive payment in coordination with service provider server 130.

In various embodiments, client service provider application 112 may also provide payments and/or transfers to users and/or groups of users, for example, payments to individual sellers or friends for items and/or transfers between known associates. Client service provider application 112 may be implemented as a user interface enabling the user to enter payment options for storage by client device 110 (e.g., using a digital wallet), select and provide payment options on checkout/payment of one or more items with a merchant, and complete a transaction for the item(s) through a purchase request for the item(s). In various embodiments, client service provider application 112 may retrieve, present, and communicate information over the Internet (e.g., utilize resources on the World Wide Web) or a private network. However, in other embodiments, client service provider application 112 may include a dedicated application of service provider server 130 or other entity (e.g., a merchant), which may be configured to assist in processing electronic transaction requests. Client service provider application 112 may be utilized to establish and/or maintain a user account and/or digital wallet with service provider server 130.

However, the scope of embodiments is not limited to payment applications. In fact, service provider application 112 may be used for any appropriate purpose where either sensitive or otherwise restricted information is accessed or decrypted. Thus, in another example, client service provider application 112 may provide other or different functions, such as playing restricted media.

In one example, the client device 110 and the service provider server 130 use the connection over network 160 to perform various transactions once client service provider application 112 has authenticate itself with transaction processing application 132. For instance, after authentication, client service provider application 112 may then be permitted to make or receive payments, download or play restricted media content, and the like.

However, in this example client device 110 is not necessarily under the control of the service associated with server provider server 130. For instance, if client device 110 is a device that is owned and primarily operated by a consumer, then it may be expected that malicious users would at least attempt from time to time to compromise any processes running on client device 110. For this reason, the updated white-box cryptographic algorithms discussed herein may be applied to eliminate or at least reduce the threat presented from malicious users, and specifically with respect to authentication of application 112.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, such as a mapping, compass, and/or GPS application, which may be used to determine a physical location for the user.

Other applications 114 may further include device interfaces and other display modules that may receive input and/or output information. For example, other applications 114 may contain software programs, executable by a processor, including a graphical user interface (GUI) configured to provide an interface to the user.

White-box application 116 may include a cryptographic algorithm that reads code from the code base of application 112 and encrypts or decrypts that code. For instance, in the example described above, the cryptographic algorithm decrypts the code to get client credentials therefrom. Also the cryptographic algorithm may include pairs of logical operations and their inverses (annihilating pairs) that are received either from logic generator 119 or 129 and applied during runtime. Such actions are described in more detail below with regard to FIGS. 2-5. In an example in which white-box application 116 decrypts client credentials, the decrypted client credentials may be used by client service provider application 112 to then authenticate itself over network 160 to transaction processing app 132.

Examples of cryptographic algorithms that may be implemented by white-box application 116 include Advanced Encryption Standard (AES), Data Encryption Standard (3DES), and others. The scope of embodiments is not limited to any particular cryptographic algorithm, as appropriate encryption algorithms may be adapted for use.

White-box application 116 is shown as being separate from application 112 and other applications 114, though the scope of embodiments is not so limited. Rather, white-box application 116 may be its own stand-alone application or may illustrate functionality that may be included within any of the other applications 112, 114.

Client device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and NFC devices.

Client device 110 also includes logic generator 119. In one embodiment, logic generator 119 is a separate code base from that of client service provider application 112 and white-box application 116. In this example, logic generator 119 includes code, which when executed, pseudo-randomly selects logical operations out of a larger set of logical operations and provides those selected logical operations to white-box application 116. Logic generator 119 may select logical operations and provide the logical operations in response to a request from white-box application 116 or in response to any other appropriate trigger. Also, in some embodiments, logic generator 119 may include a static code base that selects logical operations out of the same larger set of logical operations time and time again. In other embodiments, logic generator 119 may be updated from time to time so that the larger set of logical operations, from which logical operations are pseudo-randomly selected, may be updated by logic generator 129 (of network resource 120).

Service provider server 130 may be maintained, for example, by an online or mobile electronic transaction service provider, which may provide payment services and/or processing for electronic transactions on behalf of users. In this regard, service provider server 130 includes one or more processing applications which may be configured to interact with client device 110 and/or another device/server to facilitate payment for a transaction, including establishment of accounts and configuration of mobile device applications to use an acceptance mechanism for electronic payments by a merchant. In one example, service provider server 130 may be provided by PAYPAL®, Inc. of San Jose, Calif., USA. However, in other embodiments, service provider server 130 may be maintained by or include a credit provider, payment services provider, financial data provider, and/or other service provider, which may provide payment services to the user.

Service provider server 130 of FIG. 1 includes a transaction processing application 132, other applications 134, an encryption application 136, and a network interface component 138. Transaction processing application 132 and other applications 134 may correspond to executable processes, procedures, and/or applications with associated hardware. In other embodiments, service provider server 130 may include additional or different modules having specialized hardware and/or software as required.

Transaction processing application 132 may correspond to one or more processes to execute modules and associated specialized hardware of service provider server 130 to receive and/or transmit information from client device 110 for establishing payment accounts, as well as processing and completing of one or more transactions between a customer and a merchant. In this regard, transaction processing application 132 may correspond to specialized hardware and/or software to establish user accounts, which may be utilized to send and receive electronic data needed to facilitate electronic transactions.

Transaction processing application 132 may manage one or more payment accounts with the user of client device 110. Transaction processing application 132 may also interact with applications at client devices (e.g., client service provider application 112 at client device 110) in order to processor complete transactions, or to download and cause to play restricted media, and the like. In some examples, client service provider application 112 may authenticate itself with transaction processing application 132 by passing a secret or other client credential information to transaction processing application 132. Transaction processing application 132 may then verify the identity or permissions of application 112. Once transaction processing application 132 has authenticated application 112, then it may proceed with further actions, such as moving forward with a payment transaction, send information allowing application 112 to play restricted media content, or the like.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing service provider server 130. In various embodiments where not provided by transaction processing application 132, other applications 134 may include connection and/or communication applications, which may be utilized to communicate information to over network 160.

In various embodiments, service provider server 130 includes at least one network interface component 138 adapted to communicate client device 110 and/or network resource 120 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network resource 120 may include one or more devices, such as servers, that communicate with client device 110 and service provider server 130 over network 160. Communication component 128 may include hardware and functionality similar to that described above with respect to communication module 118 and network interface component 138. In short, communication component 128 allows network resource 120 to communicate over network 160 with other devices.

Furthermore, logic generator 129 may include an application that is operable to update either or both of the logic operations at logic generator 119 or the code base at client service provider application 112. For instance, logic generator 129 may provide a larger set of annihilating pairs of logical operations to logic generator 119 and from which logic generator 119 may pseudo-randomly select logical operations for the cryptographic algorithm at white-box application 116. In other embodiments, logic generator 129 may perform pseudo-random selection of logical operations and apply them to white-box application 116, thereby bypassing logic generator 119. Thus, logic generator 129 may, itself, store a plurality of annihilating pairs of logical operations and provide those annihilating pairs to client device 110. Furthermore, logic generator 129 may be responsive to client device 110 and service provider server 130 to provide updated sets of annihilating pairs to logic generator 119 or white-box application 116 from time to time. Examples of logical operations include lookup tables, Boolean operators, and other simple functions that may be implemented within a cryptographic algorithm.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
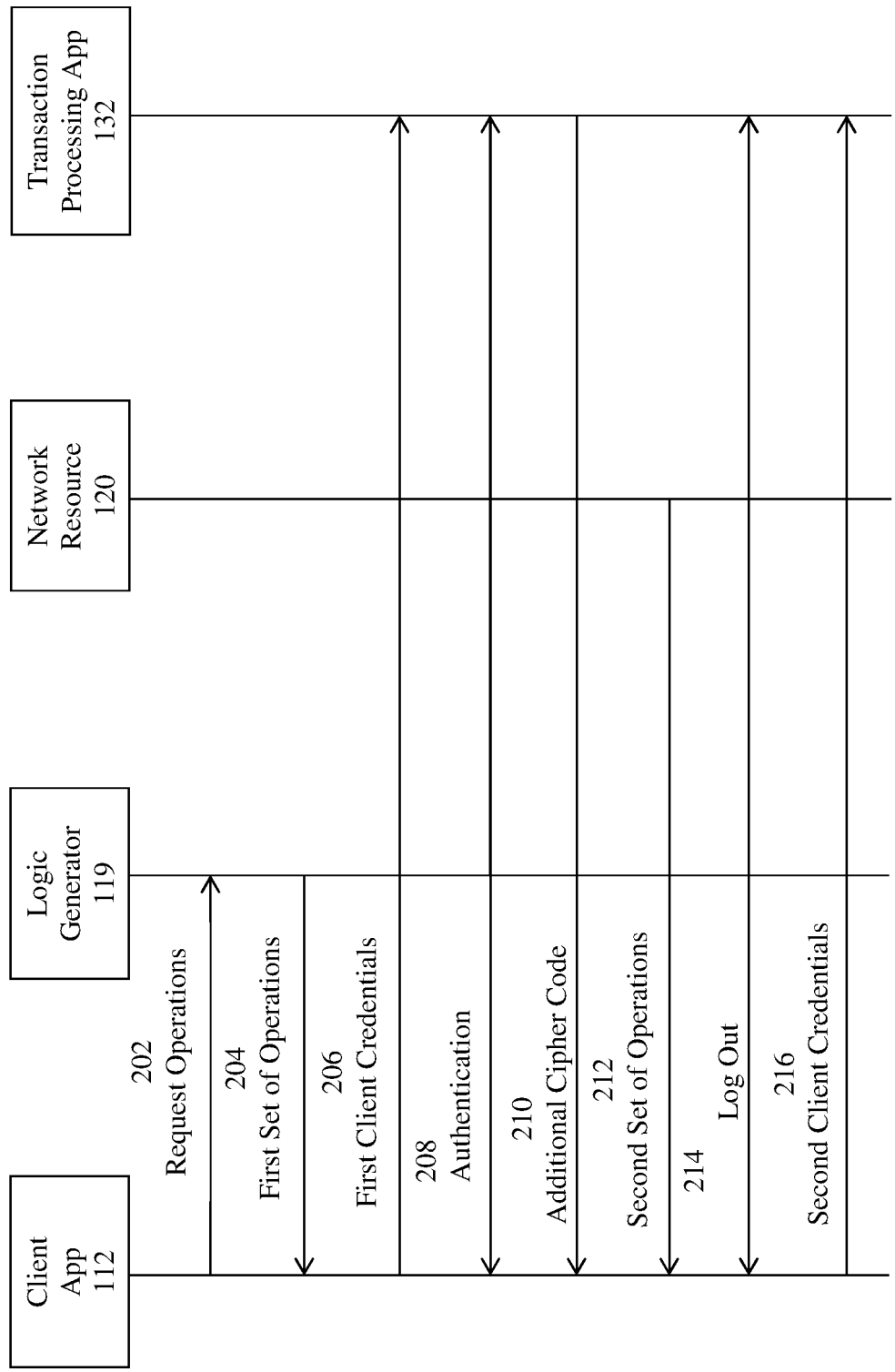
FIG. 2 is a schematic diagram of an example signal diagram showing updating of cryptographic processes in white-box systems and authentication of client applications, according to one embodiment.

FIG. 2 is a signal diagram, adapted according to one embodiment. The signal diagram of FIG. 2 illustrates a relationship between client service provider application 112, logic generator 119, network resource 120, and transaction processing application 132. Applications 112 and 132 as well as logic generator 119 and network resource 120 are described in more detail above with respect to FIG. 1. In this example, applications 112 and a network resource 120 communicate over network 160 (FIG. 1). Furthermore, for simplicity, it is assumed that white-box application 116 is included within client service provider application 112, though in other embodiments applications 112 and 116 may be separate applications.

One example use case begins with client service provider application 112 requesting logical operations from logic generator 119 at message 202. In response, logic generator 119 sends a first set of logic operations at message 204. For instance, logic generator 119 may transmit code, which when executed, provides the functionality of the operations. In another example, logic generator 119 may send data that identifies sets of logical operations that can be instantiated by white-box application 116 during runtime.

Figure 3:
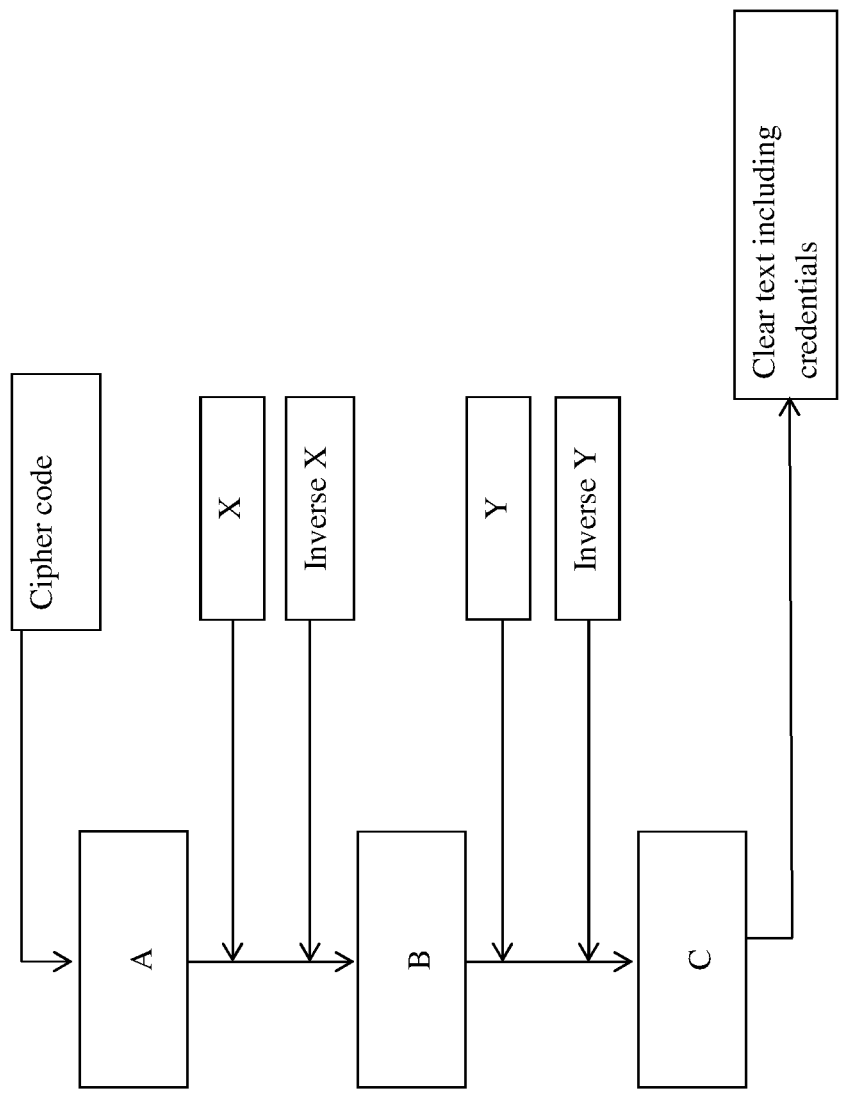
FIG. 3 is an illustration of an example encryption/decryption algorithm for use in an example white-box system, according to one embodiment.

Continuing with the example, client application 112 applies the set of received operations to the cryptographic algorithm. An example is shown at FIG. 3. FIG. 3 illustrates a cryptographic algorithm 300, according to one embodiment. Cryptographic algorithm 300 is illustrated with few boxes for simplicity, and it is understood that various embodiments may include more complicated algorithms as appropriate. For instance, each of boxes A, B, C, may represent a discrete logical operation that may be performed in AES, DES, or some other cryptographic technique. Examples of discrete logical operations may include, bit shifts, XOR, and the like.

The operations provided by logic generator 119 and received by application 112 are illustrated by X, inverse X, Y, and inverse Y. X and inverse X illustrate one annihilating pair, and Y and inverse Y illustrate a second annihilating pair. For instance, with respect to X and inverse X, a given pattern of bits applied to X would result in some different pattern, according to the truth table of X. However applying the output of X to inverse X returns the original pattern of bits. The same is true with Y and inverse Y.

In the example of FIG. 3, X and inverse X are applied by application 112 or 116 between A and B. Thus, the output of A is applied to B, though the intermediate steps of X and inverse X add complexity to the cryptographic algorithm 300. X and inverse X, through their complexity, make it difficult for a malicious user to identify A or B by monitoring the memory registers. The same is true of Y and inverse Y, which are applied between B and C.

Application 112 or 116 applies cipher code to cryptographic algorithm 300, and the output is clear text, including client credentials. Thus, in the example of FIG. 3, the core of the cryptographic algorithm is A, B, C, and applying the cipher code to simply A, B, C would also return the clear text including the credentials. Furthermore, while the example shows only two annihilating pairs and only three operations in the core algorithm, it is understood that various embodiments may include any number of annihilating pairs and any number of operations of a core algorithm.

Additionally, while the cryptographic algorithm 300 is shown as decrypting cipher code, other embodiments may use a similar algorithm to encrypt data. Thus, while the flow in FIG. 300 shows encrypted code being decrypted, various embodiments may input clear text to A and receive as an output cipher code. Or put another way, various embodiments may encrypt as well as decrypt.

Returning to FIG. 2, client application 112 inputs the cipher code to the cryptographic algorithm and receives clear text including client credentials as an output.

Application 112 then uses those client credentials to authenticate itself to the transaction processing application 132 by message 206. For instance, application 112 may then pass some or all of the client credentials (e.g., the decrypted secret) to the transaction processing application 132, and authentication handshaking happens at messages 208.

Client application 112 receives additional cipher code from the transaction processing application 132 at message 210 and receives an updated set of logical operations from network resource 120 at message 212. Application 112 then logs out from the transaction processing application 132 at message 214.

At this point in the example signal diagram, client application 112 has new cipher code, which may include new client credentials different from the first client credentials. Client application 112 also has a second set of logical operations (or, rather, logic generator 119 may receive and store the second set of logical operations). The next time client application 112 logs into transaction processing application 132, the system repeats the same process, except that the logical operations applied to the cryptographic algorithm may be different, and the new cipher code is applied and decrypted. Thus, at message 216, client application 112 provides the second set of client credentials 216 to the transaction processing application 132 as part of the authentication process. Of course, some applications may update the set of logical operations but not update the cipher code (or vice versa). Furthermore, some embodiments may send message 212 to the applications 112, 116 as part of the logon process, instead of before logout 214. In fact, message 212 may be sent at any appropriate point in the process.

Figure 4:
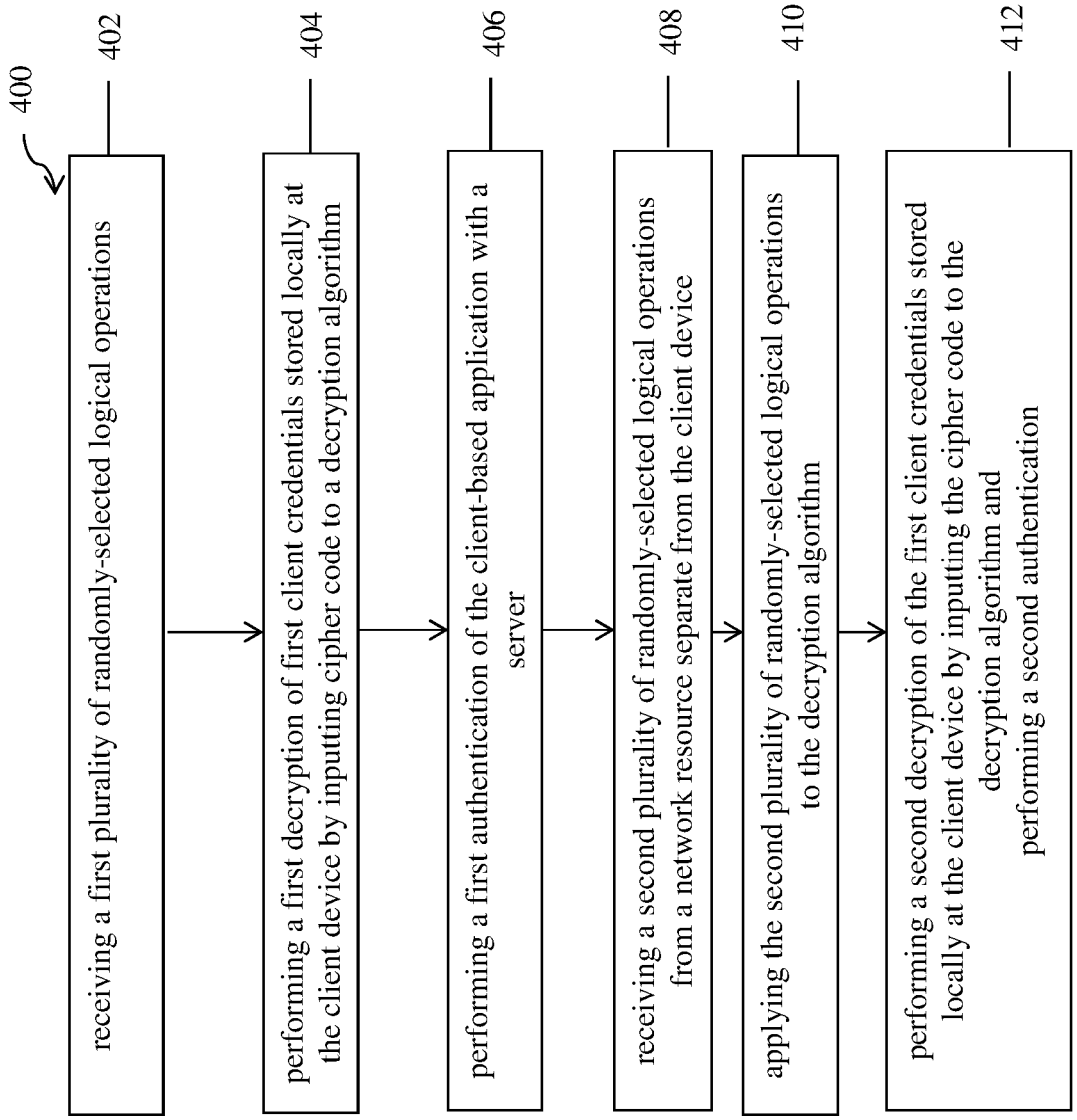
FIGS. 4 and 5 are flowcharts illustrating an embodiment of methods for updating cryptographic processes of white-box systems, according to one embodiment.

FIG. 4 is an illustration of an example method 400, adapted according to one embodiment. The actions of method 400 may be performed by a client-based application running on a client device (e.g., client device 110). The various actions are provided by the device as a result of executing computer-readable code by one or more processors, wherein the computer-readable code includes instructions. For instance, client service provider application 112, white-box application 116, and logic generator 119 of FIG. 1 running on a client device may execute instructions to provide the functionality described below.

At action 402, the client-based application receives a first plurality of randomly-selected logical operations. For instance, the client-based application may request the first plurality of randomly-selected logical operations from a local resource, e.g., logic generator 119. In response, the local resource provides the randomly-selected logical operations. An example is described above with respect to messages 202 and 204 of FIG. 2.

Continuing with the example of action 402, the client-based application and the logical operations generator may both be running on the same client device, but have separate code bases. For instance, a code base of the client-based application may include encrypted client credentials and instructions to instantiate core logical operations of a cryptographic algorithm, whereas a code base of the logical operations generator may be implemented as a separate file or separate set of files or otherwise not share code with the client-based application.

At action 404, the client-based application performs a first decryption of the first client credentials. In this example, the first client credentials are stored locally at the client device, and performing the first decryption includes inputting cipher code to a decryption algorithm. In one instance, the first client credentials may be encrypted and stored in the binary code base of the client-based application. An example of the decryption algorithm is explained above with respect to FIG. 3. Thus, an example of performing action 404 may include inputting cipher code to the cryptographic algorithm and receiving as an output of the cryptographic algorithm clear text that includes client credentials. Examples of client credentials may include a client ID, a password, a secret, an indication of client permissions, and the like. In various embodiments, the client credentials may include any information, which when transferred in whole or in part to a server application entitles the client-based application to perform some function, such as proceeding with a transaction or playing restricted media.

At action 406, the client-based application performs a first authentication of the client-based application with a server. An example is discussed above with respect to messages 206 and 208 of FIG. 2. Authentication may, in some instances, include transferring the client credentials of action 404 in whole or in part to a server application. At the server side, the server may compare the received client credentials to known client credentials or otherwise verify the identity, permissions, or other trait of the client-based application.

At action 408, the client-based application receives a second plurality of randomly-selected logical operations from a network resource separate from the client device. In one example, the network resource has updated a set of logical operations from which the local logical generator makes pseudorandom selections. In another example, the client-based application receives randomly-selected logical operations directly from the network resource. Thus, in various embodiments, action 408 may include receiving the second plurality of randomly-selected logical operations directly from the network resource or from some intermediary, such as a logic generator. An example is discussed above with respect to message 212 of FIG. 2.

At action 410, the client-based application applies the second plurality of randomly-selected logical operations to the decryption algorithm. In one example, the client-based application may apply the second plurality of randomly-selected operations in the same or similar fashion as the first plurality of randomly-selected logical operations were applied previously. An example is discussed above with respect to FIG. 3, wherein cryptographic algorithm 300 includes both core operations A, B, C and two annihilating pairs including X, Y, and their respective inverses.

At action 412, the client-based application performs a second decryption of the first client credentials by inputting the cipher code to the decryption algorithm. The client-based application may then authenticate itself with the server application, as described above at action 406.

The scope of embodiments is not limited to the specific series of actions shown in FIG. 4. Rather, the scope of embodiments may include techniques that add, omit, rearrange, or modify ones of those actions. For instance, other embodiments may further include the client-based application receiving additional cipher code including second client credentials, decrypting the second client credentials, and then performing authentication using the second client credentials, such as in the example of messages 210 and 216 of FIG. 2. Or put another way, the actions of method 400 of FIG. 4 may be combined with the actions of method 500 of FIG. 5 (described below) so that various embodiments may update the randomly-selected logical operations, the cipher code, or both in order to increase security.

Figure 5:
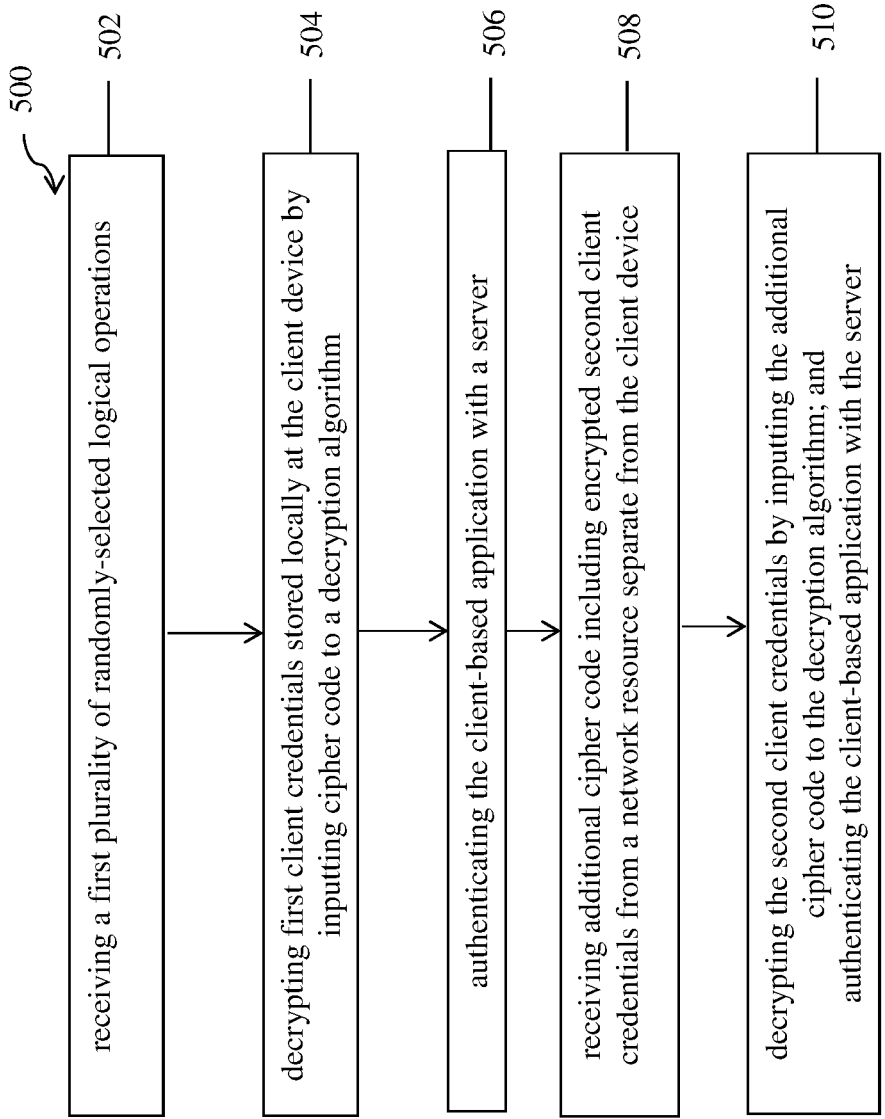

FIG. 5 is an illustration of an example method 500, adapted according to one embodiment. The actions of method 500 may be performed by a client-based application running on a client device (e.g., client device 110). The various actions are provided by the device as a result of executing computer-readable code by one or more processors, wherein the computer-readable code includes instructions. For instance, client service provider application 112, white-box application 116, and logic generator 119 of FIG. 1 running on a client device may execute instructions to provide the functionality described below.

Actions 502-506 are similar to actions 402-406 (described above).

At action 508, the client-based application receives additional cipher code. In this example, the additional cipher code may include encrypted second client credentials from a network resource separate from the client device. Furthermore, in one example, the cipher code may update or replace portions of the code base of the client-based application. An example is discussed above with respect to message 210 of FIG. 2. Thus, in an example in which the code base of the client-based application includes the client credentials, all or part of the client credentials may be updated or replaced along with all or part of the code base itself. Furthermore, action 508 may be performed at a software update or firmware update of the client-based application in some examples.

At action 510, the client-based application decrypts the second client credentials by inputting the additional cipher code to the decryption algorithm. The decryption algorithm may include randomly-selected annihilating pairs, such as described above with respect to actions 402 and 408 at FIG. 4. Example action 510 may further perform authentication of the client-based application with the server, similarly to that described above with respect to actions 406 and 412 of FIG. 4.

Once again, the scope of embodiments is not limited to the specific series of actions described above with respect to FIGS. 4 and 5. For instance, as noted above, the actions of FIGS. 4 and 5 may be combined in some embodiments so that subsequent authentication processes may include using different cipher code and different client credentials, different annihilating pairs of logical operations, or a combination thereof. Furthermore, various embodiments may include repeating the actions of FIGS. 4 and 5 whenever authentication or other actions are performed. Moreover, various embodiments may include employing the actions of FIGS. 4 and 5 for purposes other than authentication with a server, such as requesting a permission after authentication, accessing a secure element of the mobile device, or the like.

Figure 6:
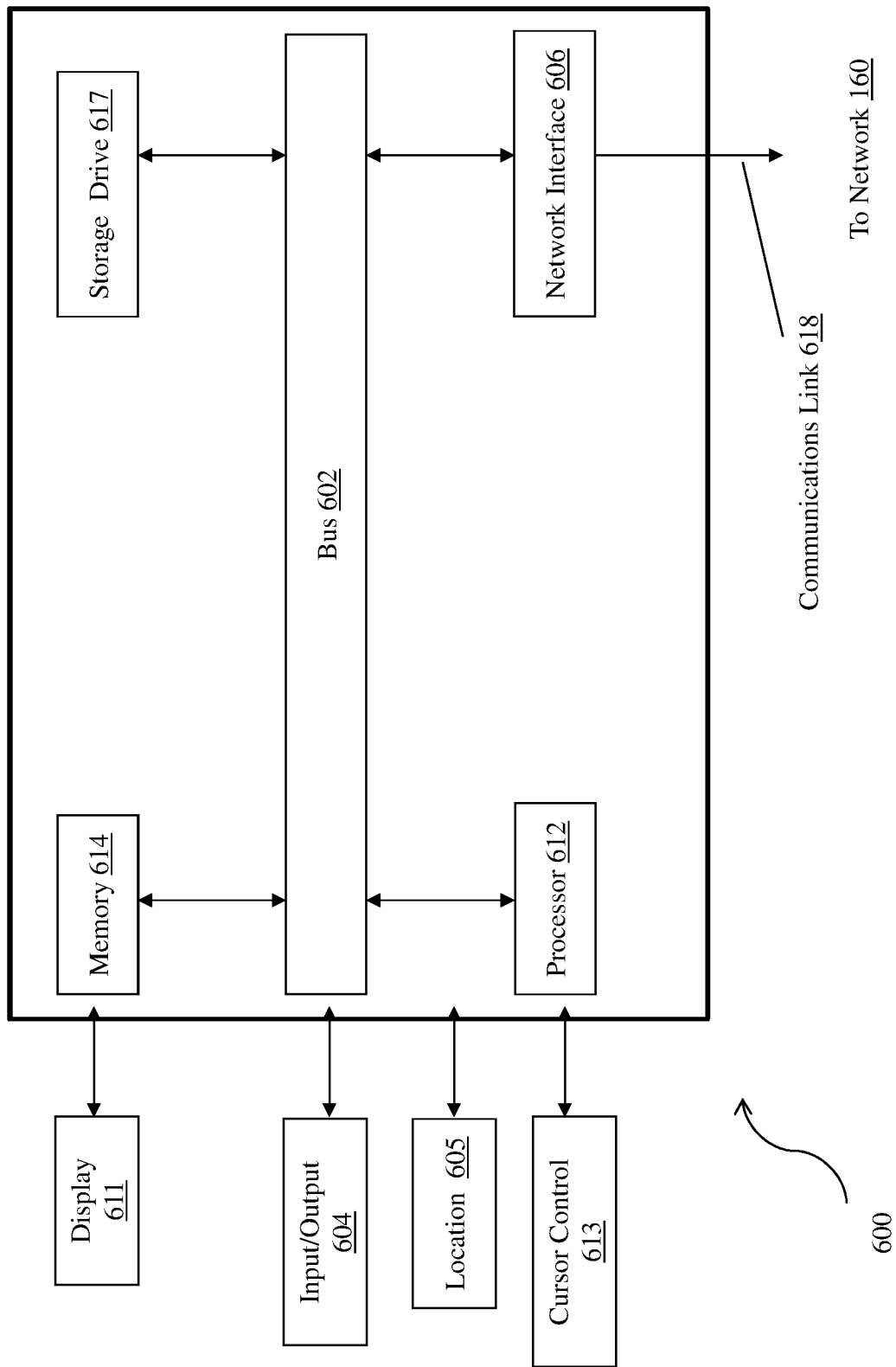
FIG. 6 is an illustration of an example computer system that may be used as a client device or a server device and to perform the actions described with respect to FIGS. 1-5, according to one embodiment.

Referring now to FIG. 6, an embodiment of a computer system 600 suitable for implementing, for example, the computing devices 110, 120, and 130 of FIG. 1 discussed above. It should be appreciated that other devices utilized in an electronic transaction in the system discussed above may be implemented as the computer system 600 in a manner as follows.

In accordance with various embodiments of the present disclosure, computer system 600, such as a smart phone, computer, and/or a network server, includes a bus 602 or other communication mechanism for communicating information, which interconnects subsystems and components, such as a processing component 612 (e.g., processor, microcontroller, digital signal processor (DSP), etc.), a system memory component 614 (e.g., RAM) a storage drive component 617 (e.g., solid-state, hard drive, or optical), a network interface component 606 (e.g., wireless card, modem, or Ethernet card), a display component 611 (e.g., a touchscreen, CRT, or LCD), an input/output component 604 (e.g., keyboard, keypad, a touchscreen), a cursor control component 613 (e.g., mouse, pointer, or trackball), and/or a location determination component 605 (e.g., a Global Positioning System (GPS) device as illustrated, a cell tower triangulation device, and/or a variety of other location determination devices known in the art). In one implementation, the storage drive component 617 may comprise a database having one or more storage drive components.

In accordance with embodiments of the present disclosure, the computer system 600 performs specific operations by the processor 612 executing one or more sequences of instructions contained in the memory component 614, such as described herein with respect to FIGS. 1-5 discussed above. Such instructions may be read into the system memory component 614 from another computer readable medium, such as storage drive 617. In other embodiments, hard-wired circuitry may be used in place of or in combination with software instructions to implement the present disclosure.

Logic may be encoded in a computer readable medium, which may refer to any tangible a non-transitory medium that participates in providing instructions to the processor 612 for execution. Such a medium may take many forms, including but not limited to, non-volatile media and volatile media. In various implementations, non-volatile media includes hard drive or solid state drives, such as the storage drive component 617, and volatile media includes dynamic memory, such as the system memory component 614.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of the computer systems 600 coupled by a communication link 618 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 618 and the network interface component 606. The network interface component 606 may include an antenna, either separate or integrated, to enable transmission and reception via the communication link 618. Received program code may be executed by processor 612 as received and/or stored in storage drive component 617 or some other non-volatile storage component for execution.

The present disclosure may be implemented using hardware, software, or combinations of hardware and software.

Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method performed on a client device for securing an electronic transaction, the method comprising:
    during a first session of a client-based application, receiving a first plurality of randomly-selected logical operations from a client-based logical operations generator that is on the client device;
    applying the first plurality of randomly-selected logical operations to a decryption algorithm;
    performing, after the applying the first plurality of randomly-selected logical operations, a first decryption of first client credentials stored locally at the client device by inputting cipher code to the decryption algorithm;
    subsequent to the first decryption of the first client credentials, performing a first authentication of the client-based application with a server, including transferring the first client credentials to the server;
    after the first authentication and during a second session of the client-based application, receiving a second plurality of randomly-selected logical operations from a network resource separate from the client device;
    updating the client-based logical operations generator to include the second plurality of randomly-selected logical operations;
    applying the second plurality of randomly-selected logical operations to the decryption algorithm; and
    performing, after the applying the second plurality of randomly-selected logical operations, a second decryption of the first client credentials stored locally at the client device by inputting the cipher code to the decryption algorithm, wherein the decryption algorithm includes the second plurality of randomly-selected logical operations.

2. The method of claim 1, wherein the client-based logical operations generator has a separate code base from code storing the cipher code.

3. The method of claim 1, wherein the second plurality of randomly-selected logical operations comprises a plurality of lookup tables.

4. The method of claim 1, wherein the second plurality of randomly-selected logical operations comprises a plurality of Boolean operators.

5. The method of claim 1, wherein the second plurality of randomly-selected logical operations comprises:
multiple sets of logical operations and corresponding inverse logical operations that annihilate one another.

6. The method of claim 1, further comprising:
performing a second authentication of the client-based application with the server subsequent to the second decryption.

7. The method of claim 6, further comprising:
after the second authentication, receiving additional cipher code including encrypted second client credentials from a network resource separate from the client device; and
performing a first decryption of the encrypted second client credentials by inputting the additional cipher code to the decryption algorithm.

8. The method of claim 7, further comprising:
performing a third authentication of the client-based application with the server, including transferring the encrypted second client credentials to the server.

9. The method of claim 1, wherein the first client credentials comprise: a client identifier and a password.

10. A non-transitory machine-readable medium having stored thereon machine-readable instructions executed cause a machine to perform operations comprising:
receiving a first plurality of randomly-selected logical operations by a client application from a logical operations generator local to a client device running the client application;
applying the first plurality of randomly-selected logical operations to a decryption algorithm;
decrypting, after the applying the first plurality of randomly-selected logical operations, first client credentials by inputting cipher code to a decryption algorithm;
subsequent to decrypting the first client credentials, transferring at least a portion of the first client credentials to a server to authenticate the client application;
after authenticating the client application, updating the decryption algorithm with a second plurality of randomly-selected logical operations that are received from a network resource separate from the client application, wherein the second plurality of randomly-selected logical operations comprises: multiple sets of logical operations and corresponding inverse logical operations that annihilate one another; and
after updating the decryption algorithm, decrypting the first client credentials by inputting the cipher code to the decryption algorithm.

11. The non-transitory machine-readable medium of claim 10, wherein the cipher code is stored at the client device.

12. The non-transitory machine-readable medium of claim 10, wherein the client application comprises an electronic payment application, and wherein the client device comprises a mobile device.

13. The non-transitory machine-readable medium of claim 10, wherein the logical operations generator comprises a code base separate from a code base storing the cipher code.

14. A system, comprising:
a non-transitory memory; and
one or more hardware processors coupled to the non-transitory memory and configured to read instructions from the non-transitory memory to cause the system to perform operations comprising:
during a first session of a client-based application that is executed by a client device, applying a first plurality of randomly-selected logical operations to a cryptographic algorithm at a client device, wherein the first plurality of randomly-selected logical operations are received from a client-based logical operations generator that is local to the client device;
performing, after the applying the first plurality of randomly-selected logical operations, a first decryption of first client credentials stored locally at the client device by inputting cipher code to the cryptographic algorithm;
subsequent to the first decryption of the first client credentials, performing a first authentication of the client-based application with a server, including transferring at least a portion of the first client credentials to the server;
after the first authentication and during a second session of the client-based application, applying a second plurality of randomly-selected logical operations to the cryptographic algorithm, wherein the second plurality of randomly-selected logical operations are received from a network resource separate from the client device, and wherein the applying the first plurality of randomly-selected logical operations or the applying the second plurality of randomly-selected logical operations increases a length of the cryptographical algorithm; and
performing a second decryption of the first client credentials stored locally at the client device by inputting the cipher code to the cryptographic algorithm, wherein the cryptographic algorithm includes the second plurality of randomly-selected logical operations.

15. The system of claim 14, wherein the operations further comprise:
performing a second authentication of the client-based application with the server subsequent to the second decryption.

16. The system of claim 15, wherein the operations further comprise:
after the second authentication, receiving additional cipher code including encrypted second client credentials from the network resource; and
performing a first decryption of the encrypted second client credentials by inputting the additional cipher code to the cryptographic algorithm.

17. The system of claim 16, wherein the operations further comprise:
performing a third authentication of the client-based application with the server, including transferring the encrypted second client credentials to the server.

18. The system of claim 14, wherein the first plurality of randomly-selected logical operations comprises a plurality of Boolean operators.

19. The system of claim 14, wherein the first plurality of randomly-selected logical operations comprises a plurality of annihilating pairs of logical operations.

20. The system of claim 14, wherein the first client credentials comprise: a client identifier and a password.

* * * * *